(No Model.)
M. S. MILLARD & W. H. H. TAINTER.
Pump.
No. 239,971. Patented April 12, 1881.
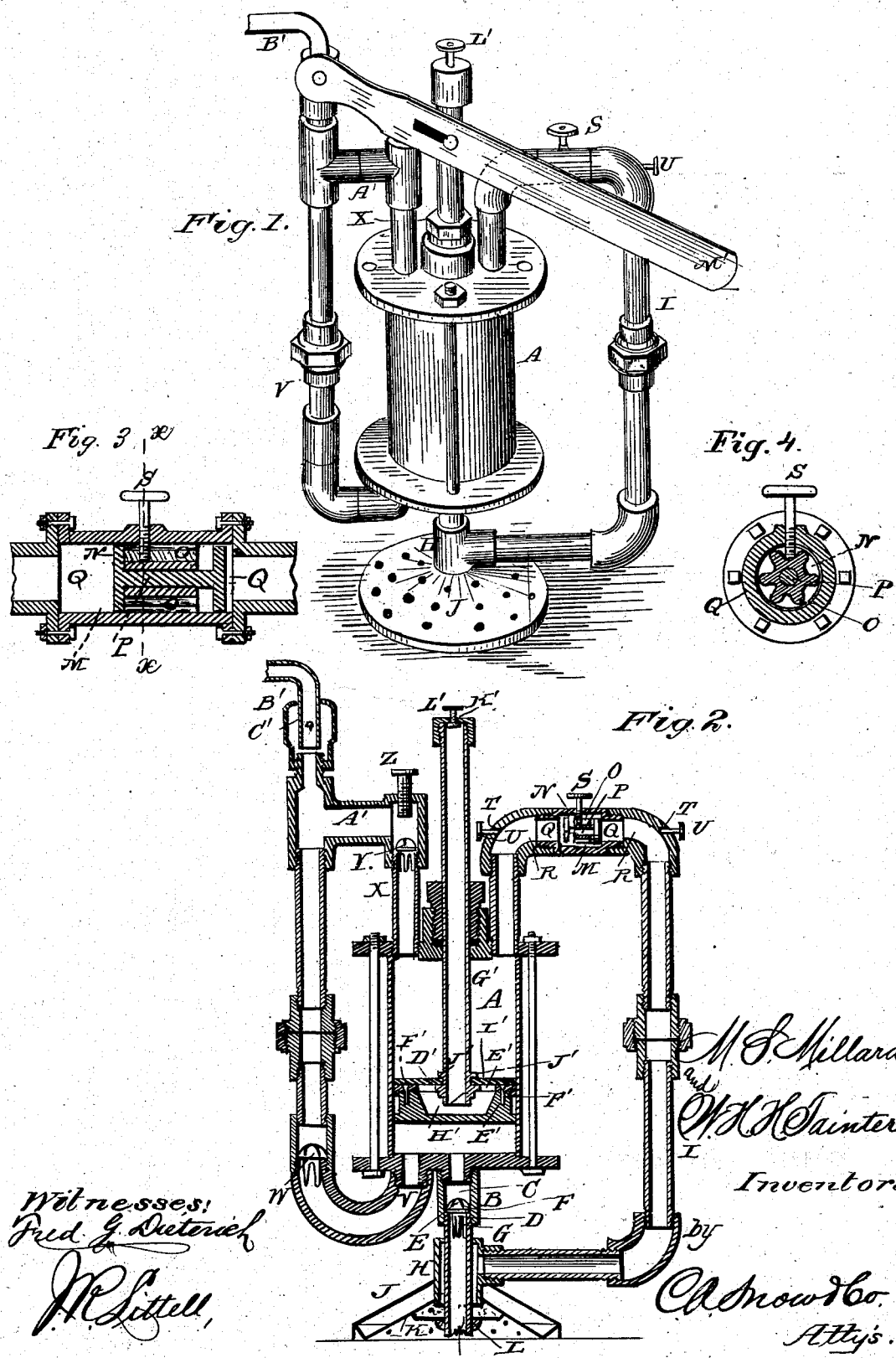
Witnesses:
Fred G. Dieterich
J. M. Littell
M. S. Millard,
W. H. H. Tainter,
Inventors,
by C. A. Snow & Co.
Att'ys.

UNITED STATES PATENT OFFICE.

MARTIN S. MILLARD AND WILLIAM H. H. TAINTER, OF KANSAS CITY, MO.

PUMP.

SPECIFICATION forming part of Letters Patent No. 239,971, dated April 12, 1881.

Application filed May 25, 1880. (No model.)

*To all whom it may concern:*

Be it known that we, MARTIN S. MILLARD and WILLIAM H. H. TAINTER, of Kansas City, in the county of Jackon and State of Missouri, have invented certain new and useful Improvements in Pumps; and we do hereby declare that the following is a full, clear, and exact description of the invention, which will enable others skilled in the art to which it appertains to make and use the same, reference being had to the accompanying drawings, which form a part of this specification.

Figure 1 is a perspective view, and Fig. 2 is a vertical sectional view; and Fig. 3 is a detail view of the valve P. Fig. 4 is a cross-sectional view of Fig. 3.

Corresponding parts in the figures are denoted by like letters of reference.

This invention relates to force-pumps; and it consists in certain improvements in the construction of the same, which will be hereinafter fully described, and particularly pointed out in the claims.

In the drawings hereto annexed, A represents the pump-cylinder, which is provided with a pipe, B, arranged at the lower end of said cylinder, for the admission of water. The pipe B is provided with a chamber, C, to accommodate a valve, D, consisting of a semi-spherical head, E, fluted or grooved, as shown at F, and connected by a screw-stem or otherwise to a fluted stem or guide, G, sliding in the lower part of pipe B, so as to enable the valve to open upward, as represented. To insure a tight joint, suitable packing of leather or rubber should be interposed between the head and stem of the valve D.

Around the pipe B, below the chamber C, is arranged a collar-pipe, H, open at the lower end for the admission of water, and connected by a pipe, I, with the upper end of cylinder A.

Surrounding the lower end of pipe B and the collar-pipe H is arranged a filter-case, consisting of a perforated funnel, J, in which is fitted a perforated plate, K, held in place by a nut, L. Said filter-case may be filled with gravel, charcoal, or other filtering and purifying material. When filtering is not required it serves as a fender and guard to prevent the admission into the pump of vegetable matter or other obstructions.

The upper horizontal portion of pipe I is provided with a chamber, M, containing a two-way valve, N. The latter consists of a longitudinally-fluted pipe, O, fitted in chamber M, and containing a sliding stem, P, provided at each end with a valve, Q, seats for said valves being formed by the ends R of pipe I, which enter the valve-chamber. To hold the pipe O in position, a set-screw, S, is employed. The ends of the horizontal portion of pipe I are provided with openings T, closed by plugs U, which may be removed for the insertion of an iron rod when it shall be desirable to shift the position of the two-way valve. The latter, it will be seen, may be so adjusted as to prevent the passage of fluid either into or out of the cylinder, as the case may be. As arranged in the drawings, it will permit the passage of fluid through pipe I into the upper end of the cylinder.

The lower end of the cylinder is provided with an exit-pipe, V, in which is arranged a valve, W. The upper end of cylinder also has an exit-pipe, X, containing a valve, Y; but said valve may be held firmly to its seat, and thus thrown out of action, by means of a set-screw, Z, arranged in the upper end of pipe X, as shown. Pipes V and X are connected by a pipe, A', provided with a nozzle, B', and air-chamber C', to insure a steady flow of water.

The piston D' consists, essentially, of two plates, E' E', connected by screws or bolts F', packing being interposed, in the usual manner, between the rims of said plates.

The piston-stem G' is hollow, and its lower end communicates with a recess, H', in the piston, said recess being covered by a valve-plate, I', sliding upon the stem G', and having its motion confined by a collar, J', upon the latter. The upper end of the piston-stem is provided with a valve, K', which may be opened or closed by means of a set-screw, L'.

To operate the piston, a lever, M', or any other suitable means may be employed.

As a hydraulic pump, the operation of our invention will be readily understood from the foregoing description and by reference to the drawings hereto annexed. To convert it into an air-pump, it is only necessary to change the position of the two-way valve and to open the valve K' and lower set-screw Z, thereby throwing valve Y out of operation. Air will then, on the downstroke of the piston, enter the cylinder through the piston-stem and under the valve-plate I'. On the upstroke it will be forced out through pipe I and the filter-case, the contents of which are thus cleansed and purified; or it may be conducted through suitable tubing from the collar-pipe H to distant parts of the mine, (where the pump is used as a mining-pump,) or to any place where it shall be needed.

Having thus described our invention, we claim and desire to secure by Letters Patent of the United States—

1. The combination, with the entrance-pipe of a force-pump, of a filter-case consisting of a perforated funnel, a perforated plate fitted therein, and means for securing both in position, as set forth.

2. The combination, in a force-pump, of the cylinder A, entrance-pipe B, collar-pipe H, pipe I, connecting the latter with the upper end of the cylinder and having two-way valve N, and suitable exit-pipes, V X, substantially as set forth.

3. The two-way valve N, consisting of a longitudinally-fluted pipe, O, having sliding stem P, carrying valves Q Q, as set forth.

4. The pipe I, having openings T T, provided with plugs U U, in combination with the adjustable two-way valve N and the set-screw S, substantially as set forth.

5. The piston D', having recess H', valve-plate I', and tubular stem G', having valve K', controlled by a set-screw, L', substantially as set forth.

6. The herein-described improved convertible hydraulic and pneumatic pump, consisting essentially of the cylinder A, pipe B, having foot-valve D, collar-pipe H, pipe I, having two-way valve N, exit-pipe V, having valve W, exit-pipe X, having valve Y and set-screw Z, and the piston D', having recess H', valve-plate I', and tubular stem G', having valve K' and set-screw L', all combined and operating substantially as and for the purpose herein shown and specified.

In testimony that we claim the foregoing as our own we have hereto affixed our signatures in presence of two witnesses.

MARTIN SANFORD MILLARD.
  WILLIAM HENRY HARRISON TAINTER.

Witnesses:
  EDWARD MARSHALL WRIGHT,
  PHILIP SHELLEY BROWN.